United States Patent
Kato et al.

(10) Patent No.: US 8,690,258 B2
(45) Date of Patent: Apr. 8, 2014

(54) GUIDE STRUCTURE OF VEHICLE SEATBELT

(75) Inventors: Tomotake Kato, Wako (JP); Yuichi Mashiko, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 12/942,033

(22) Filed: Nov. 9, 2010

(65) Prior Publication Data

US 2011/0133540 A1    Jun. 9, 2011

(30) Foreign Application Priority Data

Dec. 4, 2009   (JP) ................................. 2009-276920

(51) Int. Cl.
*B60R 22/00*    (2006.01)

(52) U.S. Cl.
USPC ............................ 297/473; 297/468; 297/485

(58) Field of Classification Search
USPC ......................................... 297/468, 473, 485
See application file for complete search history.

(56) References Cited

U.S. PATENT DOCUMENTS

| | | | | |
|---|---|---|---|---|
| 4,730,875 A | * | 3/1988 | Yoshitsugu | .................... 297/468 |
| 5,439,272 A | | 8/1995 | Hallet et al. | |
| 5,452,941 A | * | 9/1995 | Halse et al. | .................... 297/480 |
| 5,564,785 A | * | 10/1996 | Schultz et al. | ............. 297/452.2 |
| 5,984,419 A | * | 11/1999 | Partington et al. | ............ 297/473 |
| 6,726,287 B1 | * | 4/2004 | Janz | ............................... 297/483 |
| 6,767,055 B1 | * | 7/2004 | Sparks | ....................... 297/216.14 |
| 6,817,672 B2 | * | 11/2004 | Matsunuma | ............. 297/452.18 |
| 2007/0069510 A1 | * | 3/2007 | Suyama et al. | ................ 280/733 |

FOREIGN PATENT DOCUMENTS

| | | |
|---|---|---|
| JP | H04-135949 | 5/1992 |
| JP | 2007-125937 | 5/2007 |
| JP | 2009-051306 | 3/2009 |

OTHER PUBLICATIONS

Japanese Office Action for corresponding JP Application No. 2009-276920, Dec. 12, 2011.
Chinese Office Action for corresponding CN Application No. 201010578816.4, Jun. 5, 2012.

* cited by examiner

*Primary Examiner* — Philip Gabler
(74) *Attorney, Agent, or Firm* — Ditthavong Mori & Steiner, P.C.

(57) ABSTRACT

A guide structure of a vehicle seatbelt includes a belt guide. The belt guide is provided at one of a left corner and a right corner defined by a left side frame, a right side frame, and an upper frame. The one corner faces a belt pulled out from a seatbelt device. The left side frame and the right side frame extend vertically. The upper frame connects an upper end of the left side frame to an upper end of the right side frame. The belt guide protrudes upwardly with respect to the upper frame and forwardly with respect to the left side frame and the right side frame so that when the belt is placed on an occupant who sits on the seat, a portion of the belt that is placed on a shoulder of the occupant is guided by the belt guide.

18 Claims, 3 Drawing Sheets

GUIDE STRUCTURE OF VEHICLE SEATBELT

CROSS REFERENCES TO RELATED APPLICATIONS

The present invention claims priority under 35 U.S.C. §119 to Japanese Patent Application No. 2009-276920, filed in the Japan Patent Office on Dec. 4, 2009, entitled "Guide Structure of Vehicle Seatbelt", the entire contents of which are incorporated herein by reference.

BACKGROUND OF THE INVENTION

1. Field of the Invention

The present invention relates to a belt guide of a vehicle seatbelt.

2. Description of the Related Art

When an occupant sits on a seat for a vehicle, the occupant restrains his/her body with a seatbelt. A seatbelt of a three-point supporting type, which is one type of seatbelt device that is generally used, includes a shoulder belt and a lap belt. The shoulder belt is placed from a shoulder to the chest of the occupant. The lap belt is placed on the hip of the occupant. Such a seatbelt is widely known. (Refer to, for example, Japanese Unexamined Patent Application Publication No. 2007-125937 (FIG. 1).)

As discussed in Japanese Unexamined Patent Application Publication No. 2007-125937, the seatbelt device using the seatbelt of the three-point supporting type includes a chest protection inflating portion and a head/chin protection inflating portion. The chest protection inflating portion is deployed towards and protects the chest of the occupant during a collision. The head/chin protection inflating portion is deployed towards the back of the head of the occupant and protects his/her head and chin during the collision.

When the occupant is not seated, the seatbelt of the three-point supporting type that is used in many vehicles is automatically retracted. The retracted seatbelt is accommodated in, for example, a retractor (belt retractor). When the occupant is seated, the occupant pulls out the accommodated seatbelt from an upper anchor, and fastens the seatbelt. The upper anchor is provided at a position that is above the shoulder of the occupant so that the occupant can place the seatbelt on his/her shoulder when fastening the seatbelt.

When a vehicle including such a seatbelt device collides with an obstacle that is in front of the vehicle, the upper part of the body of the occupant who sits on a seat tilts forward. However, the chest of the occupant is restrained by a shoulder belt. Therefore, the occupant feels a strong pressure. It is desirable that the pressure that the occupant feels be small.

SUMMARY OF THE INVENTION

According to one aspect of the present invention, a guide structure of a vehicle seatbelt includes a belt guide. The belt guide is provided at one corner among a left corner and a right corner defined by a left side frame, a right side frame, and an upper frame that constitute a seat back frame of a seat for a vehicle. The one corner faces a belt pulled out from a seatbelt device provided at a side portion of a vehicle body. The left side frame and the right side frame extend vertically. The upper frame connects an upper end of the left side frame and an upper end of the right side frame to each other. The belt guide protrudes upwardly with respect to the upper frame and forwardly with respect to the left side frame and the right side frame so that when the belt is placed on an occupant who sits on the seat, a portion of the belt that is placed on a shoulder of the occupant is guided by the belt guide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

An embodiment of the present invention will hereunder be described with reference to the attached drawings.

A vehicle seat 11 and a guide structure of a seatbelt according to the embodiment will be described.

Figure 1:
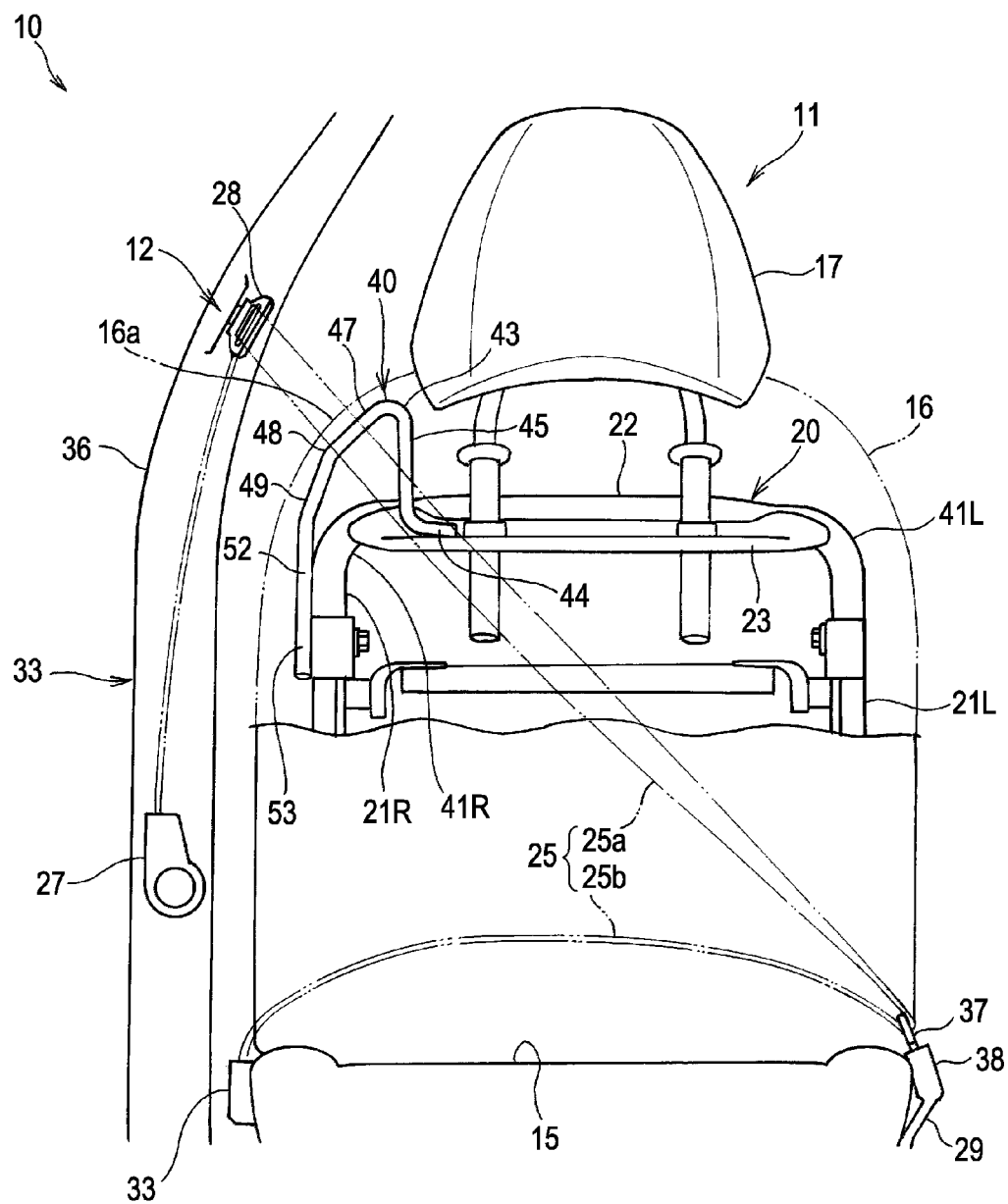
FIG. 1 is a front view of a vehicle seatbelt, a guide structure, and a seat according to an embodiment of the present invention.
Figure 2:
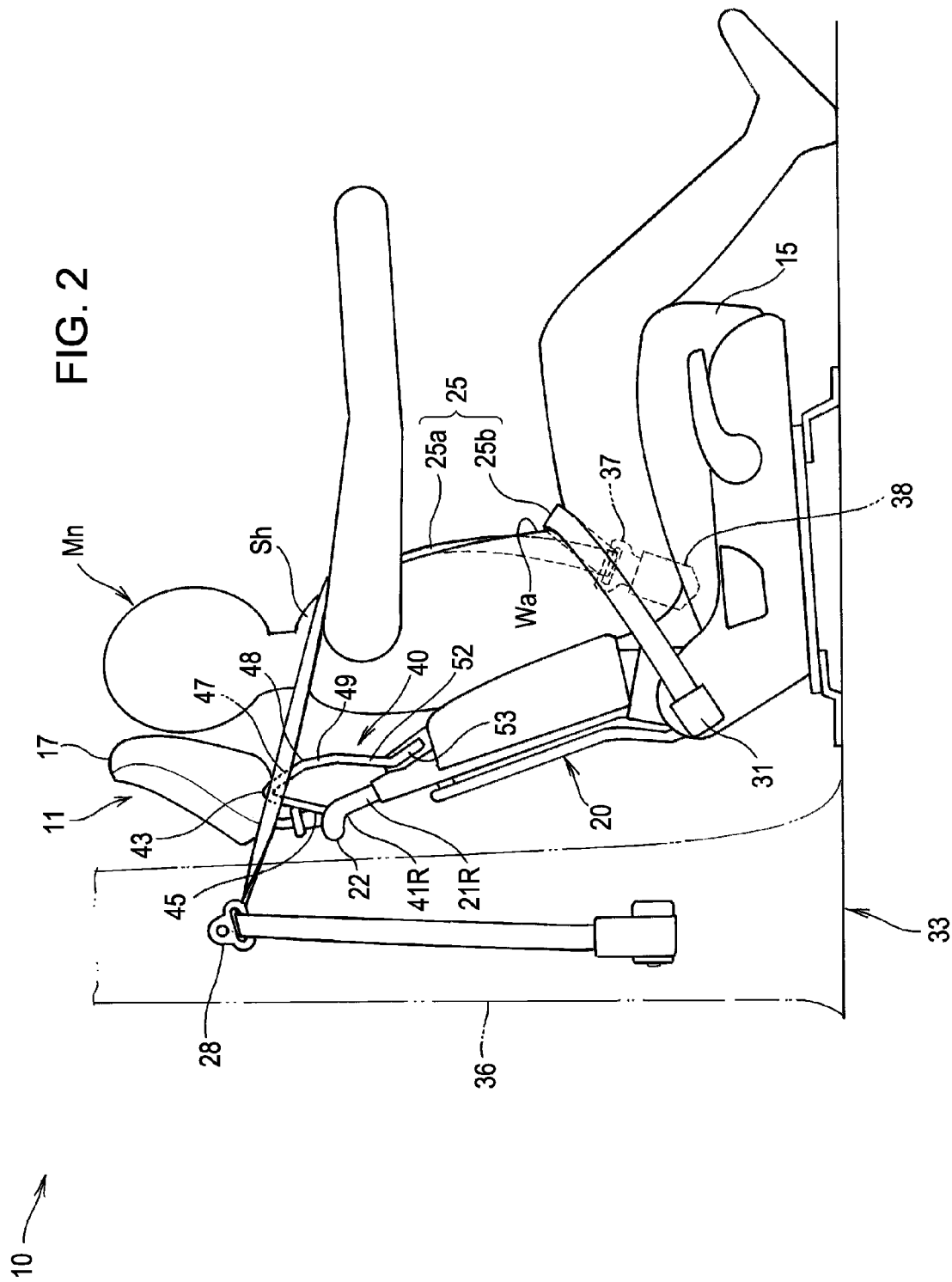
FIG. 2 is a side view of the seatbelt, the guide structure, and the seat shown in FIG. 1.

FIG. 1 is a front view of a state of the seat 11 and a seatbelt device 12, which are provided at a vehicle 10. FIG. 2 is a side view of the state of the seat 11 and the seatbelt device 12. The vehicle 10 shown in FIGS. 1 and 2 is exemplified as being a vehicle with a right-hand steering wheel. The seat 11 is exemplified as being a driver's seat where a driver (Mn) (occupant Mn) (see FIG. 2) sits. The seatbelt device 12 is exemplified as a device for the driver Mn.

As shown in FIGS. 1 and 2, the vehicle 10 includes the seat 11 and the seatbelt device 12. The seat 11 includes a cushion seat 15, a seat back 16, and a headrest 17. The seat back 16 is supported by a seat back frame 20.

The seat back frame 20 includes a left side frame 21L and a right side frame 21R ("L" and "R" are letters that denote the left and right with reference to the occupant Mn who sits on the seat 11. This will also apply to the description below), an upper frame 22, and a headrest supporting member 23. The left side frame 21L and the right side frame 21R extend vertically. The upper frame 22 connects the upper end of the left side frame 21L and the upper end of the right side frame 21R to each other. The headrest supporting member 23 is integrated to the front side of the upper frame 22. The headrest supporting member 23 supports the headrest 17.

The seatbelt device 12 retrains the occupant Mn who sits on the seat 11 with a belt 25 (seatbelt, webbing), and includes a retractor 27 (belt wind-up unit 27). According to the seatbelt device 12, the belt 25 that restrains one shoulder Sh and a hip Wa of the occupant Mn at the same time can be retracted by the retractor 27.

The seatbelt device 12 has a three-point supporting structure that supports the belt 25 with three anchors, that is, an upper anchor 28, a center anchor 29, and a lower anchor 31. At a side portion of a vehicle body 33, the upper anchor 28 (that is, the through anchor 28) is disposed at the upper portion of a right center pillar 36. At a lower portion at a side of the seat 11 opposite to the upper anchor 28, the center anchor 29 is provided at a side portion of the cushion sheet 15. The lower anchor 31 is provided at a side portion of the cushion sheet 15 at a side opposite to the center anchor 29.

The belt 25 includes a shoulder belt 25a and a lap belt 25b. The shoulder belt 25a restrains one shoulder of the occupant Mn. The lap belt 25b restrains the hip of the occupant Mn. A tongue 37 is provided between the shoulder belt 25a and the lap belt 25b (that is, at a turnaround portion of the belt 25) so as to be movable in a longitudinal direction of the belt. The tongue 37 is removably mounted to a buckle 38, secured to the center anchor 29, by a one-touch operation.

A belt guide 40 for guiding the belt 25 is provided at an upper corner of the seat back frame 20. More specifically, the belt guide 40 is provided at a corner 41R among a left corner 41L and the right corner 41R, formed by the left side frame 21L, the right side frame 21R, and the upper frame 22. The right corner 41R faces the shoulder belt 25a (that is, the belt 25) pulled out from the seatbelt device 12 provided at the side portion of the vehicle body 33.

In the embodiment, since the retractor 27 and the upper anchor 28 are provided at the right center pillar 36, the belt guide 40 is provided at the right corner 41R accordingly. When the retractor 27 and the upper anchor 28 are provided at a left center pillar, the belt guide 40 is provided at the left corner 41L accordingly.

Such a belt guide 40 protrudes upwardly with respect to the upper frame 22 and forwardly with respect to the left side frame 21L and the right side frame 21R so that, of portions of the belt 25 placed on the occupant Mn who sits on the seat 11, the portion that is placed on a right shoulder Sh of the occupant Mn (occupant's shoulder Sh), that is, the portion of the shoulder belt 25a situated near the right shoulder Sh can be guided forwardly and downwardly.

The belt guide 40 is formed of one linear member extending upwardly from the upper frame 22, being curved forwardly and downwardly from an upper end 43 of the belt guide 40, and extending to the right side frame 21R, positioned at the right corner 41R (one corner 41R). The belt guide 40 can be formed by bending the one linear member, so that the belt guide 40 can be produced at a low cost. Both ends of the belt guide 40 are joined, one end to the upper frame 22 and the other end to the right side frame 21R by, for example, welding, bolting, or caulking.

It is desirable to use a metal having a predetermined springiness, such as a spring steel including a piano wire. Here, for the linear member, an elongated pipe may be used in addition to a wire rod.

More specifically, the belt guide 40 includes an upper joint 44, an upwardly extending portion 45, a first guide portion 47, a second guide portion 49, a downwardly extending portion 52, and a lower joint 53. The upper joint 44 is joined to the headrest supporting member 23. The upwardly extending portion 45 extends upwardly to a height from an end portion of the upper joint 44 to where it overlaps a lower end of the headrest 17 (near a lower end of the upper anchor 28). The first guide portion 47 extends forwardly (here and hereunder, refers to a side of the figures towards anyone looking at the figures) and downwardly from the upper end 43 of the upwardly extending portion 45. The second guide portion 49 further extends forwardly and downwardly of the vehicle from a lower end 48 of the first guide portion 47. The downwardly extending portion 52 extends downwardly towards the right side frame 21R from a lower end of the second guide portion 49. The lower joint 53 extends along the side frame 21R from a lower end of the downwardly extending portion 52 and is joined to the right side frame 21R.

The first guide portion 47 and the second guide portion 49 form the shape of a dogleg as a whole. The lower end 48 of the first guide portion 47 is hereunder called a "bent point 48" between the first guide portion 47 and the second guide portion 49. At a boundary of the bent point 48, an inclination of the first guide portion 47 and an inclination of the second guide portion 49 differ from each other. The inclination of the first guide portion 47 is less than the inclination of the second guide portion 49.

The first guide portion 47 has the shoulder belt 25a (placed on the right shoulder Sh of the occupant Mn who sits on the seat 11) placed on and stopped by its upper surface, and is inclined. That is, when the vehicle 10 is not colliding, in other words, ordinarily, the inclination angle (with respect to a horizontal line) of the first guide portion 47 is set to an angle at which the shoulder belt 25a placed on the right shoulder Sh of the occupant Mn does not slide off.

Moreover, the inclination angle of the first guide portion 47 is set to an angle at which, when the upper part of the body of the occupant Mn tilts forward by inertia due to a collision of the vehicle with an obstacle that is in front of the vehicle, the shoulder belt 25a that is pushed forward by the upper part of the body of the occupant Mn is guided and is moved forwardly and downwardly along the first guide portion 47.

On the other hand, the inclination angle of the second guide portion 49 is set larger than the inclination angle of the first guide portion 47 so that, when the shoulder belt 25a pushed forwardly by the upper part of the body of the occupant who has tilted forward moves forwardly and downwardly of the bent point 48, the shoulder belt 25a moves more easily.

The seat back frame 20 and the belt guide 40 are covered by the seat back 16. Therefore, the belt guide 40 actually receives the shoulder belt 25a by an upper corner 16a of the seat back 16. Moreover, since the seat back 16 is relatively soft, the belt guide 40 essentially receives the shoulder belt 25a.

Next, the operation of the belt guide 40 having the above-described structure will be described.

Figure 3A:
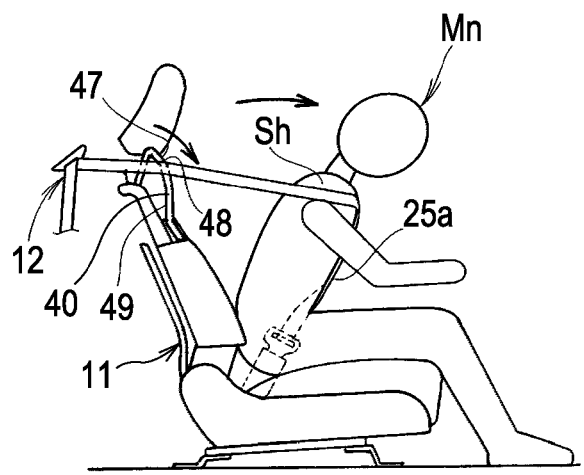
FIGS. 3A to 3B show behaviors of the seatbelt according to the embodiment of the present invention with respect to an occupant during a collision of a vehicle.
Figure 3B:
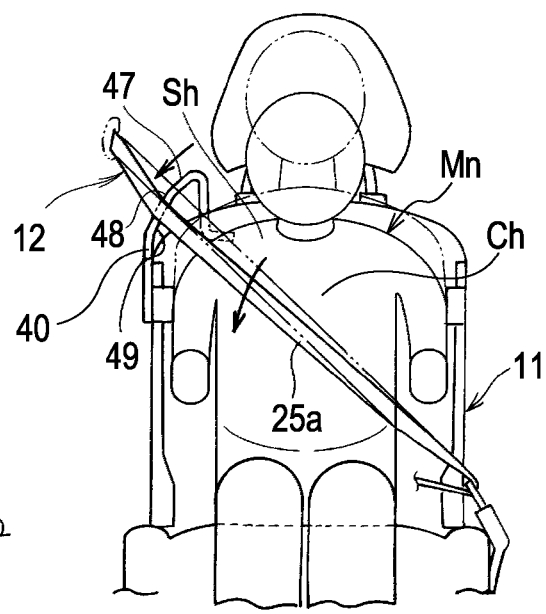

FIG. 3A is a side view of the seat 11 and the seatbelt device 12 according to the embodiment, and corresponds to FIG. 2. FIG. 3B is a front view of the seat 11 and the seatbelt device 12 shown in FIG. 3A, and corresponds to FIG. 1.

Figure 3C:
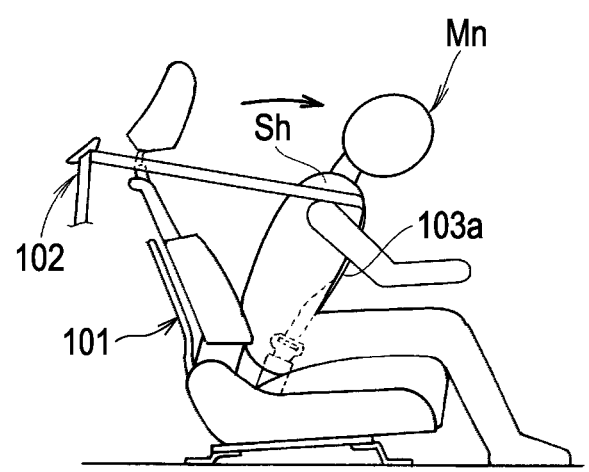
FIGS. 3C and 3D show behaviors of a seatbelt of a comparative example with respect to an occupant during a collision of a vehicle.
Figure 3D:
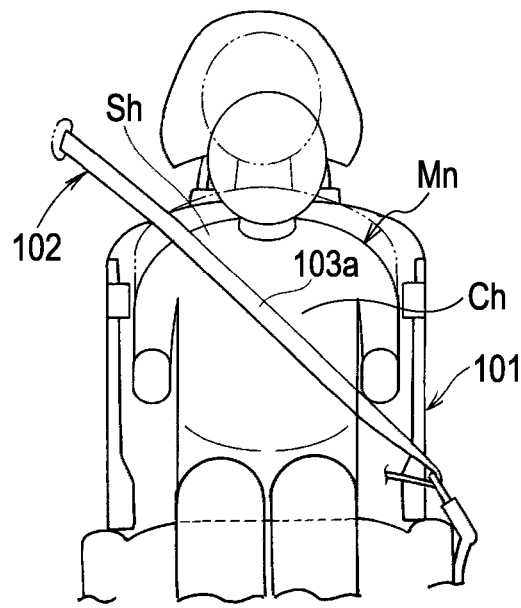

FIG. 3C is a side view of a seat 101 and a seatbelt device 102 of a comparative example. FIG. 3D is a front view of the seat 101 and the seatbelt device 102 shown in FIG. 3C.

In the comparative example shown in FIGS. 3C and 3D, the seat 11 is not provided with a belt guide for guiding a shoulder belt 103a. The shoulder belt 103a extends to a shoulder Sh linearly from a position that is higher than the shoulder Sh, and restrains a chest Ch. When a vehicle collides with an obstacle that is in front of the vehicle, the upper part of the body of an occupant Mn tilts forward due to inertia. As a result, the chest Ch of the occupant Mn is strongly pushed against the shoulder belt 103a. This causes the occupant Mn to feel a strong pressure on his/her chest Ch.

In the embodiment shown in FIGS. 3A and 3B, the seat 11 is provided with the belt guide 40 for guiding the shoulder belt 25a. The shoulder belt 25a extends linearly to the shoulder Sh from a position that is higher than the shoulder Sh, and restrains the chest Ch. When a vehicle collides with an obstacle that is in front of the vehicle, the upper part of the body of the occupant Mn tilts forward. At this time, the shoulder belt 25a is guided by the belt guide 40, and moves forwardly and downwardly along the belt guide 40. That is, the shoulder belt 25a follows the movement of the occupant Mn. Therefore, the shoulder belt 25a can receive the entire upper part of the body of the occupant Mn. Consequently, impact force that acts upon the chest Ch can be spread, thereby making it possible to reduce the pressure that the occupant Mn receives and feels.

Although the guide structure of the seatbelt according to the embodiment of the present invention is described using the seatbelt device of a type that is accommodated in a center pillar as an example, the guide structure is not limited thereto. It may also be other types, such as a type that is accommodated in a rear pillar, or a type accommodated in a roof for the back seat.

The guide structure of the seatbelt according to the embodiment of the present invention is suitable for use at a driver's seat or a front passenger's seat.

According to the embodiment of the present invention, there is provided the belt guide which guides, of the portions of the belt, the portion of the belt that is placed on the shoulder of the occupant. When the upper part of the body of the occupant who sits on the seat tilts forward due to a collision of a vehicle with an obstacle that is in front of the vehicle, the belt is guided by and moves along the belt guide. That is, the belt follows the movement of the occupant. Therefore, the belt can receive an entire portion from the shoulder to the chest during the collision of the vehicle. By receiving the entire portion from the shoulder to the chest, shock applied to the chest can be spread, thereby making it possible to reduce the pressure that the occupant receives and feels.

The belt guide may be formed of one linear member extending upwardly from the upper frame, being curved forwardly and downwardly from an upper end of the belt guide, and extending to the side frame positioned at the one of the left corner and the right corner.

The belt guide may be formed of one linear member. That is, by bending one linear member, the belt guide can be formed. Since one linear member is bent, the belt guide can be produced at a low cost.

Obviously, numerous modifications and variations of the present invention are possible in light of the above teachings. It is therefore to be understood that within the scope of the appended claims, the invention may be practiced otherwise than as specifically described herein.

What is claimed is:

1. A guide structure of a vehicle seatbelt, comprising:
    a seat back frame to support a seat back, the seat back frame comprising:
        a first side frame extending along a vertical direction;
        a second side frame extending along the vertical direction and spaced apart from the first side frame in a horizontal direction; and
        an upper frame extending along the horizontal direction and connecting an upper end of the first side frame to an upper end of the second side frame; and
    a belt guide to guide a belt pulled out from a seatbelt device provided closer to the first side frame than to the second side frame, the belt guide comprising:
        a first supporting portion connected to the upper frame and extending upwardly from the upper frame;
        a second supporting portion connected to the first side frame and extending upwardly from the first side frame; and
        a guide portion connecting an upper end of the first supporting portion to an upper end of the second supporting portion and contactable with the belt to guide the belt,
    wherein the seat back frame and the belt guide are configured to be provided entirely inside the seat back.

2. The guide structure of a vehicle seatbelt according to claim 1, wherein the guide portion is provided at a position higher than a position of the upper frame.

3. The guide structure of a vehicle seatbelt according to claim 1, wherein the guide portion is provided on a front side of the upper frame when viewed from the horizontal direction.

4. The guide structure of a vehicle seatbelt according to claim 1, wherein the guide portion includes
    a first guide portion connected to the upper end of the first supporting portion and extending from the upper end of the first supporting portion to be downwardly inclined with respect to the horizontal direction, and
    a second guide portion connected an end of the first guide portion to the upper end of the second supporting portion and extending from the end of the first guide portion to be downwardly inclined with respect to the horizontal direction.

5. The guide structure of a vehicle seatbelt according to claim 4, wherein an inclination angle of the second guide portion with respect to the horizontal direction is greater than an inclination angle of the first guide portion with respect to the horizontal direction.

6. The guide structure of a vehicle seatbelt according to claim 4, wherein the first guide portion is provided at a position higher than a position of the upper frame.

7. The guide structure of a vehicle seatbelt according to claim 6, wherein the second guide portion is provided at a position higher than a position of the upper frame.

8. The guide structure of a vehicle seatbelt according to claim 1, further comprising:
    a headrest supporting member connected to the upper frame to support a headrest,
    wherein the first supporting portion of the belt guide is connected to the headrest supporting member.

9. The guide structure of a vehicle seatbelt according to claim 1,
    wherein the upper frame is connected to the first side frame at a first corner,
    wherein the upper frame is connected to the second side frame at a second corner, and
    wherein the first supporting portion is provided closer to the first corner than to the second corner.

10. The guide structure of a vehicle seatbelt according to claim 1, wherein the seat back frame and the belt guide are configured to be entirely covered by the seat back.

11. The guide structure of a vehicle seatbelt according to claim 1, wherein the belt guide extends forward such that the guide portion is spaced apart from the upper frame in a frontward direction when the seat back frame is oriented in a vertical orientation.

12. A guide structure of a vehicle seatbelt, comprising:
    a seat back frame to support a seat back, the seat back frame comprising:
        a first side frame extending along a vertical direction;
        a second side frame extending along the vertical direction and spaced apart from the first side frame in a horizontal direction; and
        an upper frame extending along the horizontal direction and connecting an upper end of the first side frame to an upper end of the second side frame; and
    a belt guide to guide a belt pulled out from a seatbelt device provided closer to the first side frame than to the second side frame, the belt guide comprising:
        a first supporting portion connected to the upper frame and extending upwardly from the upper frame;
        a second supporting portion connected to the first side frame and extending upwardly from the first side frame; and
        a guide portion connecting an upper end of the first supporting portion to an upper end of the second supporting portion and contactable with the belt to guide the belt, wherein the seat back frame and the belt guide are configured to be provided inside the seat back, and wherein the first supporting portion is directly connected to a headrest supporting member that is directly connected to a front side of the upper frame.

13. The guide structure of a vehicle seatbelt according to claim 1, wherein the first supporting portion, the guide portion, the second supporting portion, the first side frame and the upper frame form a closed loop configured to receive the seatbelt therethrough.

14. The guide structure of a vehicle seatbelt according to claim 1, wherein the belt guide including the first supporting portion, the second supporting portion, and the guide portion is formed of one member.

15. A guide structure of a vehicle seatbelt, comprising:
a seat back frame to support a seat back, the seat back frame comprising:
    a first side frame extending along a vertical direction;
    a second side frame extending along the vertical direction and spaced apart from the first side frame in a horizontal direction; and
    an upper frame extending along the horizontal direction and connecting an upper end of the first side frame to an upper end of the second side frame; and
a belt guide to guide a belt pulled out from a seatbelt device provided closer to the first side frame than to the second side frame, the belt guide comprising:
    a first supporting portion connected to the upper frame and extending upwardly from the upper frame;
    a second supporting portion directly connected to a front side of the first side frame and extending upwardly from the first side frame; and
    a guide portion connecting an upper end of the first supporting portion to an upper end of the second supporting portion and contactable with the belt to guide the belt,
wherein the belt guide extends forward such that the guide portion is spaced apart from the upper frame in a frontward direction when the seat back frame is oriented in a vertical orientation.

16. A guide structure of a vehicle seatbelt, comprising:
a seat back frame to support a seat back, the seat back frame comprising:
    a first side frame extending along a vertical direction;
    a second side frame extending along the vertical direction and spaced apart from the first side frame in a horizontal direction; and
    an upper frame extending along the horizontal direction and connecting an upper end of the first side frame to an upper end of the second side frame; and
a belt guide to guide a belt pulled out from a seatbelt device provided closer to the first side frame than to the second side frame, the belt guide comprising:
    a first supporting portion connected to the upper frame and extending upwardly from the upper frame;
    a second supporting portion directly connected to a front side of the first side frame and extending upwardly from the first side frame; and
    a guide portion connecting an upper end of the first supporting portion to an upper end of the second supporting portion and contactable with the belt to guide the belt,
wherein the first supporting portion is directly connected to a headrest supporting member that is directly connected to a front side of the upper frame.

17. The guide structure of a vehicle seatbelt according to claim 15, wherein the second supporting portion includes a downwardly extending portion connected to the guide portion, and a lower joint connected to a lower end of the downwardly extending portion.

18. The guide structure of a vehicle seatbelt according to claim 15, wherein the first supporting portion, the guide portion, the second supporting portion, the first side frame and the upper frame form a closed loop configured to receive the seatbelt therethrough.

* * * * *